Nov. 6, 1962 B. G. MAIDEN 3,062,381
COVER HOLDER
Filed Nov. 10, 1960

INVENTOR.
BILLY G. MAIDEN
BY *Elliott & Pastoriza*
ATTORNEYS

United States Patent Office 3,062,381
Patented Nov. 6, 1962

3,062,381
COVER HOLDER
Billy G. Maiden, 793 Poli St., Ventura, Calif.
Filed Nov. 10, 1960, Ser. No. 68,422
1 Claim. (Cl. 211—105.6)

This invention relates generally to structures for holding tarpaulin-like covers and more particularly to a novel tubular structure for temporarily holding tonneaus.

For many types of convertibles, it is common practice to provide a boot or tonneau which not only covers the entire rear seat but also may extend over the right-hand front seat portion adjacent to the driver to provide a smooth and finished appearance. These tarpaulin-like covers have a tendency to flap, particularly when the automobile is traveling at high speeds. While conventional snap fasteners will serve to hold the tonneau substantially in place, there can still result annoying flapping and fluttering motion of the tonneau itself and any extensive billowing thereof may result in actual tearing of the material or pulling loose of the same from the snap fasteners.

With the foregoing in mind, it is a primary object of this invention to provide a novel holder for tarpaulin-like material such as tonneaus which will serve temporarily to secure a substantial portion of the tonneau in position to the end that flapping and possible subsequent damage is avoided.

More particularly, it is an object to provide an improved tonneau holder which may be easily inserted and removed manually without requiring the use of any special tools and which is automatically adjustable to various different dimensioned automobiles or other structures with which the device may be employed.

Briefly, these and other objects and advantages of this invention are attained by providing an elongated tubular structure composed of telescoping tubes biased apart by suitable springs. The arrangement is such that the structure may be secured to an edge of a tonneau or other tarpaulin-like material and compressed together to fit between any opposing surfaces such as the inside portions of an automobile adjacent the rear back side of the front seat. Manual releasing of the compressed structure will then permit it to expand into tight engagement with the opposing portions of the automobile and thereby securely hold the tonneau in position.

A better understanding of the invention, together with its preferred application, will be had by now referring to the accompanying drawings, in which.

Figure 1:
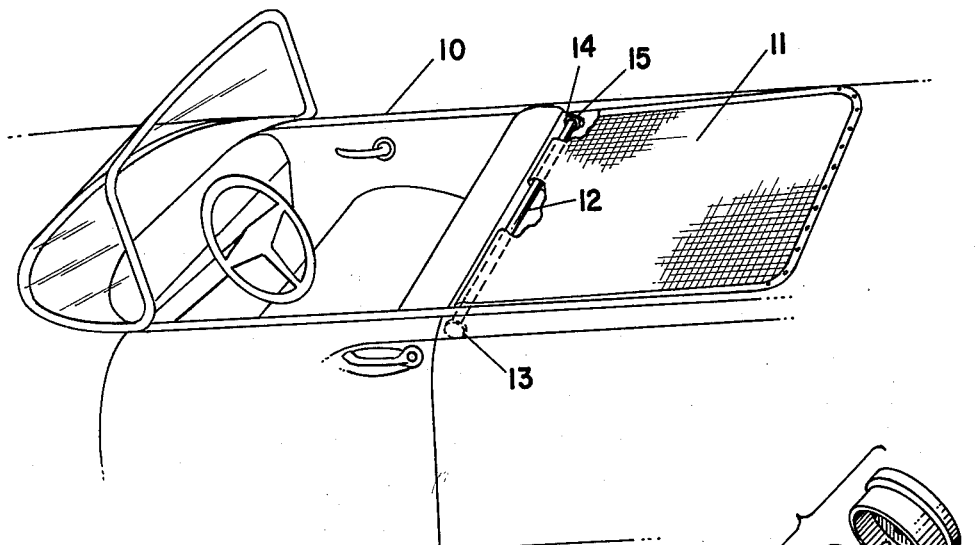
FIGURE 1 is a perspective view of a convertible body illustrating one preferred application of the holder of this invention.

Referring first to FIGURE 1, there is shown a portion of a convertible 10 including a tonneau or top cover material 11 for covering the rear seat. In accordance with the present invention, the front edge portion of the tonneau 11 is held secure by the holder 12. As shown, this holder is disposed between opposing surfaces 13 and 14 defined by inside portions of the automobile. Suitable finishing plates such as indicated at 15 may be provided to protect the upholstery of the automobile.

Figure 2:
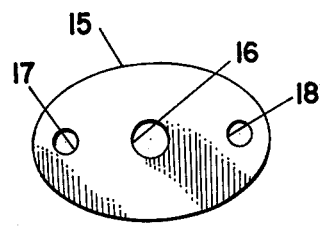
FIGURE 2 is a front elevational view of one of the finishing plates employed with the holder of FIGURE 1; and, FIGURE 3 is an enlarged perspective view partly broken away and partly exploded showing the basic components of the holder itself.

Referring to FIGURE 2, there is shown, as an example, the finishing plate 15. This plate is provided with a central aperture 16 for receiving one end structural portion of the holder 12 as will become clearer when the detailed description of the holder 12 itself is set forth. The finishing plate 15 also includes screw holes 17 and 18 for securing the plate to the side of the automobile.

Figure 3:
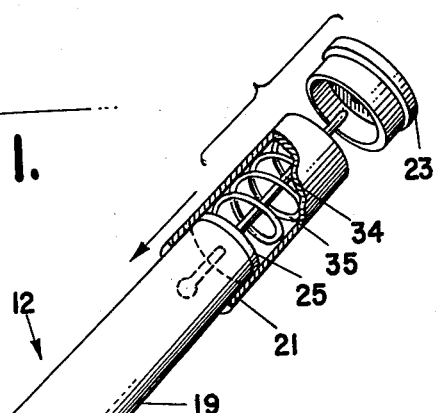
Figure 3:
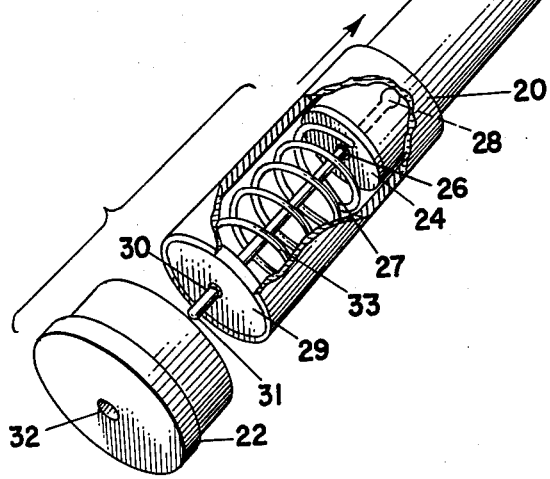

Referring now to FIGURE 3, the holder 12 itself is illustrated in perspective view. As shown, the structure includes a central tubular member 19 provided with first and second telescoping tubular members 20 and 21 received over the opposite ends of the central member 19. Suitable rubber or plastic type cap protectors 22 and 23 may in turn be received over the far ends of the telescoping members 20 and 21.

Stop means are provided for each of the telescoping members 20 and 21 to prevent these members from sliding completely off from the ends of the central tubular member 19. These stop means cooperate with washers 24 and 25 closing the ends of the member 19. Since both stop means are identical, description of one will suffice for both. Thus, with reference to the telescoping member 20, it will be noted that the washer 24 includes a reduced diameter central opening 26 through which extends one end of a rod 27. The inner end of the rod 27 terminates in a flared portion 28 of larger diameter than the reduced diameter opening 26 so that the rod cannot be pulled entirely out from the end of the central tubular member 19.

The other end of the rod 27 passes through a washer 29 closing the far end of the telescoping member 20 and is secured thereto as at 30. Preferably, the rod extends beyond the end washer 29 to provide a slight extension 31. This protruding end portion 31 is arranged to pass through a central opening 32 in the plastic protector cap 22 when the cap is inserted over the end of the telescoping member 20. A spring 33 is disposed between the end of the central member 19 and inside surface of the washer 29 in the end of the telescoping member 20 and exerts an outward biasing force on the member 20.

The other telescoping tubular member 21 similarly includes a stop means in the form of a rod 34 having an enlarged flared end passing through the washer 25 and having its other end arranged to extend through the end cap 23. A spring 35 similar to spring 33 surrounds the rod 34 to exert an outward biasing force on the telescoping member 21 tending to increase the overall length of the entire structure.

In employing the device shown in FIGURE 3 for securing a tonneau such as indicated in FIGURE 1, the end protectors 22 and 23 are inserted over the ends of the telescoping members 20 and 21 and these members then telescoped together in the direction of the arrows over the ends of the central tubular member 19. With the entire structure thus collapsed, it is a simple matter to insert it between any opposing surfaces to which the holder is to secure a tarpaulin-like material. The tarpaulin-like material itself may be provided with a turned-over seam or any other convenient loop opening or series of openings for receiving the tubular structure prior to positioning of the structure between the opposing surfaces.

Manually releasing the members will then permit the compression springs to telescope outwardly the telescoping members 20 and 21 until the extreme end cap portions 22 and 23 engage the finishing plates. Consistent alignment can be achieved by registering the projecting portions of the rods with the central apertures in the respective finishing plates.

Because of the flared ends on the rods, the telescoping members cannot be completely pulled off from the ends of the central tubular member 19 so that the structure is adequately held together. These rods simply limit the outward telescoping extent of the telescoping members. When the telescoping members are urged inwardly to compress the springs, the rods simply slide within the inner central tubular member 19.

From the foregoing description, it will be evident that the present invention provides a holder which may be readily manually inserted or removed extremely simply without the necessity of any special tools. Moreover, various different distances between opposing surfaces may be readily accommodated by adjusting the overall length to which the members are telescoped together. Therefore, a single structure may be used with different types of automobiles having different interior dimensions.

While only one embodiment of the invention has been shown and described, it should be understood that various modifications falling clearly within the scope and spirit of the invention will occur to those skilled in the art. For example, the invention may be readily applied to boats as well as to automobiles. The improved holder for tarpaulin-like materials is therefore not to be thought of as limited to the specific embodiment set forth merely for illustrative purposes.

What is claimed is:

A holder for securing at least one edge of a tarpaulin-like material between opposing surfaces, comprising, in combination: a central tubular member having reduced diameter openings in its opposite ends; first and second telescoping tubular members telescoped over said ends; first and second springs disposed between said ends of said central tubular member and the interior ends of said telescoping tubular members to bias said telescoping members outwardly in a direction to increase the overall length defined by said central and telescoping tubular members; first and second means coupling said telescoping members to said ends of said central member for limiting the outward telescoping extent of said telescoping members, each of said means comprising a rod of given length having one end passing through and secured to the end of one of said telescoping members and its other end passing through one of said reduced diameter openings to terminate in a flared portion within said central tubular member, said flared portion being larger than said opening; finishing plates having central apertures for receiving the said one end respectively of each rod, said finishing plates being adapted for securement to said opposing surfaces; and end protector caps having central openings for passing said one end respectively of each rod, said caps being positioned between said telescoping members and said finishing plates, whereby said central and telescoping members may be telescoped together to fit between said opposing surfaces and then released to provide a self-supporting structure to which said edge of said tarpaulin-like material may be affixed.

References Cited in the file of this patent
UNITED STATES PATENTS

| | | |
|---|---|---|
| 536,272 | Edsall | Mar. 26, 1893 |
| 1,732,430 | Bender et al. | Oct. 22, 1929 |
| 2,098,827 | Levan | Nov. 9, 1937 |